United States Patent
Munetoki et al.

(10) Patent No.: US 6,283,078 B1
(45) Date of Patent: Sep. 4, 2001

(54) INERTIA CHARGE INTAKE MANIFOLD FOR MULTI-CYLINDER INTERNAL COMBUSTION ENGINE AND CONNECTING METHOD FOR BRANCH PIPES OF INTAKE MANIFOLD

(75) Inventors: Hiroshi Munetoki, Kobe; Yoshihiro Kimoto, Kawanishi; Mikio Nakashima, Okazaki; Nobuyuki Homi, Higashihiroshima; Ryuji Takashina, Toyota-gun; Toshiki Miyachi, Higashihiroshima; Takeharu Suga, Kamo-gun, all of (JP)

(73) Assignees: Daihatsu Motor Co. Ltd., Ikeda; Toyota Motor Corp., Aichi; Daikyo Co. Ltd., Higashihiroshima, all of (JP)

( * ) Notice: Subject to any disclaimer, the term of this patent is extended or adjusted under 35 U.S.C. 154(b) by 0 days.

(21) Appl. No.: 09/386,445

(22) Filed: Aug. 31, 1999

(30) Foreign Application Priority Data

| Sep. 1, 1998 | (JP) | 10-246842 |
| Sep. 1, 1998 | (JP) | 10-246843 |
| Sep. 1, 1998 | (JP) | 10-246844 |
| Sep. 1, 1998 | (JP) | 10-246846 |
| Sep. 1, 1999 | (JP) | 10-246845 |

(51) Int. Cl.[7] ............................................. F02M 35/00
(52) U.S. Cl. ........................... 123/184.61; 123/184.42
(58) Field of Search ........................ 123/184.21, 184.24, 123/184.34, 184.42, 184.47, 184.61

(56) References Cited

U.S. PATENT DOCUMENTS

| 4,497,287 | 2/1985 | Schleiermacher et al. ............ 123/52 |
| 4,501,235 | * 2/1985 | Muller ............................. 123/184.41 |

(List continued on next page.)

FOREIGN PATENT DOCUMENTS

| 0 984 155 A2 | 3/2000 | (EP) | ............................ F02M/35/104 |
| 2 739 898 | 4/1997 | (FR) | ............................ F02M/35/104 |
| 63-154335 | 6/1988 | (JP) | ............................... B29D/31/00 |
| 1-99965 | 7/1989 | (JP) | ................................ F02M/35/10 |

(List continued on next page.)

OTHER PUBLICATIONS

Copies of Japanese Office Actions.

English language Abstract of JP 10–15991 dated Jan. 20, 1998.

*Primary Examiner*—Noah P. Kamen
*Assistant Examiner*—Hai Huynh
(74) *Attorney, Agent, or Firm*—Michael D. Bednarek; Shaw Pittman LLP

(57) ABSTRACT

An inertia charge intake manifold is associated with an internal combustion engine having a plurality of cylinders. The intake manifold includes a plurality of elongated separate branch pipes each corresponding to a respective one of the cylinders. The intake manifold also includes a common flange for connecting a first end of each branch pipe to the internal combustion engine. The common flange has a first surface attached to the internal combustion engine. Further, the intake manifold includes a surge tank to which a second end of each branch pipe is connected. The common flange, the surge tank and each branch pipe are made of a hard thermoplastic synthetic resin. The common flange is integrally connected to the surge tank.

11 Claims, 11 Drawing Sheets

U.S. PATENT DOCUMENTS

| | | | | |
|---|---|---|---|---|
| 4,867,110 | * | 9/1989 | Distelrath | 123/184.42 |
| 4,887,557 | * | 12/1989 | Sukimoto et al. | 29/890.08 |
| 5,094,194 | | 3/1992 | Rush, II et al. | 123/52 |
| 5,144,918 | * | 9/1992 | Tanaka et al. | 123/184.42 |
| 5,357,931 | * | 10/1994 | Semence | 123/456 |
| 5,379,735 | * | 1/1995 | Ma | 123/184.42 |
| 5,445,782 | | 8/1995 | Sadr | 264/513 |
| 5,551,387 | * | 9/1996 | Carter et al. | 123/184.42 |
| 5,630,387 | * | 5/1997 | Kamiyama | 123/184.38 |
| 5,636,605 | * | 6/1997 | Nomizo et al. | 123/184.61 |
| 5,653,200 | * | 8/1997 | Hafner et al. | 123/184.21 |
| 5,657,727 | * | 8/1997 | Uchida | 123/184.34 |
| 5,816,213 | * | 10/1998 | Gaviani et al. | 123/198 E |
| 5,826,553 | * | 10/1998 | Nakayama et al. | 123/184.42 |
| 5,992,369 | * | 11/1999 | Mehne | 123/184.21 |
| 6,041,748 | * | 3/2000 | Muller et al. | 123/184.21 |
| 6,089,202 | * | 7/2000 | Nomura et al. | 123/184.42 |
| 6,142,114 | * | 11/2000 | Yoshikawa | 123/184.42 |

FOREIGN PATENT DOCUMENTS

| | | | | |
|---|---|---|---|---|
| 3-54317 | | 3/1991 | (JP) | F02B/27/00 |
| 5-010220 | | 1/1993 | (JP) | F02M/35/10 |
| 6-8756 | | 2/1994 | (JP) | F02M/35/10 |
| 6-341355 | | 12/1994 | (JP) | F02M/35/10 |
| 7-17954 | | 3/1995 | (JP) | F02M/35/104 |
| 7-148864 | | 6/1995 | (JP) | B29D/31/00 |
| 7-35754 | | 7/1995 | (JP) | F02M/35/104 |
| 8-049610 | | 2/1996 | (JP) | F02M/35/104 |
| 8-334195 | | 12/1996 | (JP) | F16L/47/02 |
| 9-144977 | | 6/1997 | (JP) | F16L/47/02 |
| 9-250408 | | 9/1997 | (JP) | F02M/35/104 |
| 10-15991 | | 1/1998 | (JP) | B29C/45/16 |
| 10-068492 | | 3/1998 | (JP) | F16L/47/02 |
| 107870 | * | 4/1999 | (JP) . | |
| WO98/22705 | | 5/1998 | (WO) | F02M/35/024 |

* cited by examiner

INERTIA CHARGE INTAKE MANIFOLD FOR MULTI-CYLINDER INTERNAL COMBUSTION ENGINE AND CONNECTING METHOD FOR BRANCH PIPES OF INTAKE MANIFOLD

BACKGROUND OF THE INVENTION

1. Field of the Invention

The present invention relates to an intake manifold in a multi-cylinder internal combustion engine wherein the manifold is designed to super-charge an air-fuel mixture by an inertia effect. The present invention also relates to a connecting method for branch pipes of such an intake manifold.

2. Description of the Related Art

An inertia charge intake manifold includes a surge tank and a plurality of branch pipes for connecting the surge tank to the cylinder head of a multi-cylinder internal combustion engine. Each of the branch pipes needs to be relatively long for utilizing the inertia effect of the gas flow for supercharging. Further, all of the branch pipes need to be substantially equal in length for equalizing the inertia effect within the respective branch pipes.

JP-U-1(1989)-99965 discloses an inertia charge intake manifold which is made of a metal such as aluminum or suitable alloy. The intake manifold includes a surge tank located remote from the cylinder head of a multi-cylinder internal combustion engine, and a plurality of relatively long branch pipes connecting the surge tank to the cylinder head. The surge tank is located remote from the cylinder head to provide a long path for arranging the relatively long branch pipes without sharply bending.

However, since the surge tank is located remote from the cylinder head, the engine combined with the intake manifold becomes inevitably bulky. Further, difficulty arises in supporting the surge tank on the engine particularly in view of the fact that the surge tank itself must support other intake components such as a throttle body or carburetor which is relatively heavy. Indeed, a large tough support bracket is necessary for this purpose, which results in an increase of cost and weight. Still further, since the conventional manifold is made of aluminum for example, the branch pipes tend to have rather rough inner surfaces which may cause the flow resistance within the branch pipes to become unfavorably high.

SUMMARY OF THE INVENTION

It is, therefore, an object of the present invention to provide an intake manifold which is capable of eliminating or at least reducing the problems of the prior art described above.

Another object of the present invention is to provide a method of connecting the branch pipes of an intake manifold to a surge tank or to a common flange.

According to the present invention, there is provided an inertia charge intake manifold in an internal combustion engine having a plurality of cylinders. The intake manifold includes:

elongated separate branch pipes each corresponding to a respective one of the cylinders;

a common flange for connecting a first end of each branch pipe to the internal combustion engine; and a surge tank to which a second end of said each branch pipe is connected;

wherein the common flange, the surge tank and said each branch pipe are made of a hard thermoplastic synthetic resin, the common flange being integrally connected to the surge tank.

In the above arrangement, since the common flange and the surge tank are integrally connected to each other, the surge tank is directly supported by the common flange. Thus, the intake manifold as a whole can be reduced in size, as compared with the conventional intake manifold.

Further, according to the above arrangement, the overall weight of the intake manifold is advantageously reduced, since the common flange, the surge tank and the respective branch pipes are made of a resin material. In addition, with the use of a resin material, the inner surfaces of the respective branch pipes can be rendered smoother than is conventionally possible, thereby reducing the flow resistance within each branch pipe.

According to a preferred embodiment, the surge tank may have an external side surface, and the common flange may be arranged to extend generally in parallel to the external side surface of the surge tank.

With such an arrangement, the connection area between the surge tank and the common flange can be rendered comparatively large. In this manner, it is possible to increase the strength by which these two members are bonded to each other.

Preferably, said each branch pipe may be bent so that the first end is horizontally oriented and the second end is upwardly oriented. The horizontally-oriented first end may be fitted into a connecting bore formed in the common flange, while the upwardly oriented second end may be fitted into a receiving bore formed in an underside surface of the surge tank.

With such an arrangement, each branch pipe can hold on to the common flange and the surge tank without using fixing means such as an adhesive.

Preferably, the first end of said each branch pipe may be integrally formed with a cylindrical protrusion which is nonremovably fitted into a connecting bore formed in the common flange. The common flange may be provided with a connection surface attached to the internal combustion engine. The connection surface may be provided with a circular hollow portion extending around the cylindrical protrusion of said each branch pipe. The circular hollow portion may be arranged to accommodate a ring-shaped sealing member in a manner such that the sealing member partially projects beyond the connection surface of the common flange.

Advantageously, the first end of said each branch pipe may be provided with a brim coming into contact with the common flange.

According to a second aspect of the present invention, there is provided a method of connecting an end of a branch pipe of an intake manifold to another member of the intake manifold, wherein the branch pipe and said another member are made of a hard thermoplastic synthetic resin. The method includes the steps of:

providing the end of the branch pipe with a flat end surface which is generally perpendicular to an axis of the end of the branch pipe;

providing said another member with a connecting surface for fixing the flat end surface;

forming a ring-shaped protrusion on at least one of the flat end surface and the connecting surface;

arranging a heating wire around the ring-shaped protrusion;

causing the flat end surface and the connecting surface to be pressed against each other; and applying a voltage across the heating wire.

The above method may further comprise the step of arranging a ring-shaped seal member made of an elastic material between the ring-shaped protrusion and the heating wire. In this method, the voltage applying step may be performed when the seal member is pressed.

According to a third aspect of the present invention, there is provided a method of connecting an end of a branch pipe of an intake manifold to another member of the intake manifold, wherein the branch pipe and said another member are made of a hard thermoplastic synthetic resin. The method includes the steps of:

providing said another member with a connecting bore;

providing the end of the branch pipe with a cylindrical protrusion to be inserted into the connecting bore and with a brim integral with the cylindrical protrusion;

arranging a heating wire circumferentially of the connecting bore;

inserting the cylindrical protrusion into the connecting bore so that the heating wire is located adjacent to a boundary between the cylindrical protrusion and the brim of the branch pipe;

causing the brim of the branch pipe and said another member to be pressed against each other; and applying a voltage across the heating wire.

The present invention will now be described further, by way of example, on the basis of the preferred embodiment given with reference to the accompanying drawings.

DETAILED DESCRIPTION OF THE PREFERRED EMBODIMENT

Preferred embodiments of the present invention will now be described below with reference to the accompanying drawings.

Figure 1:
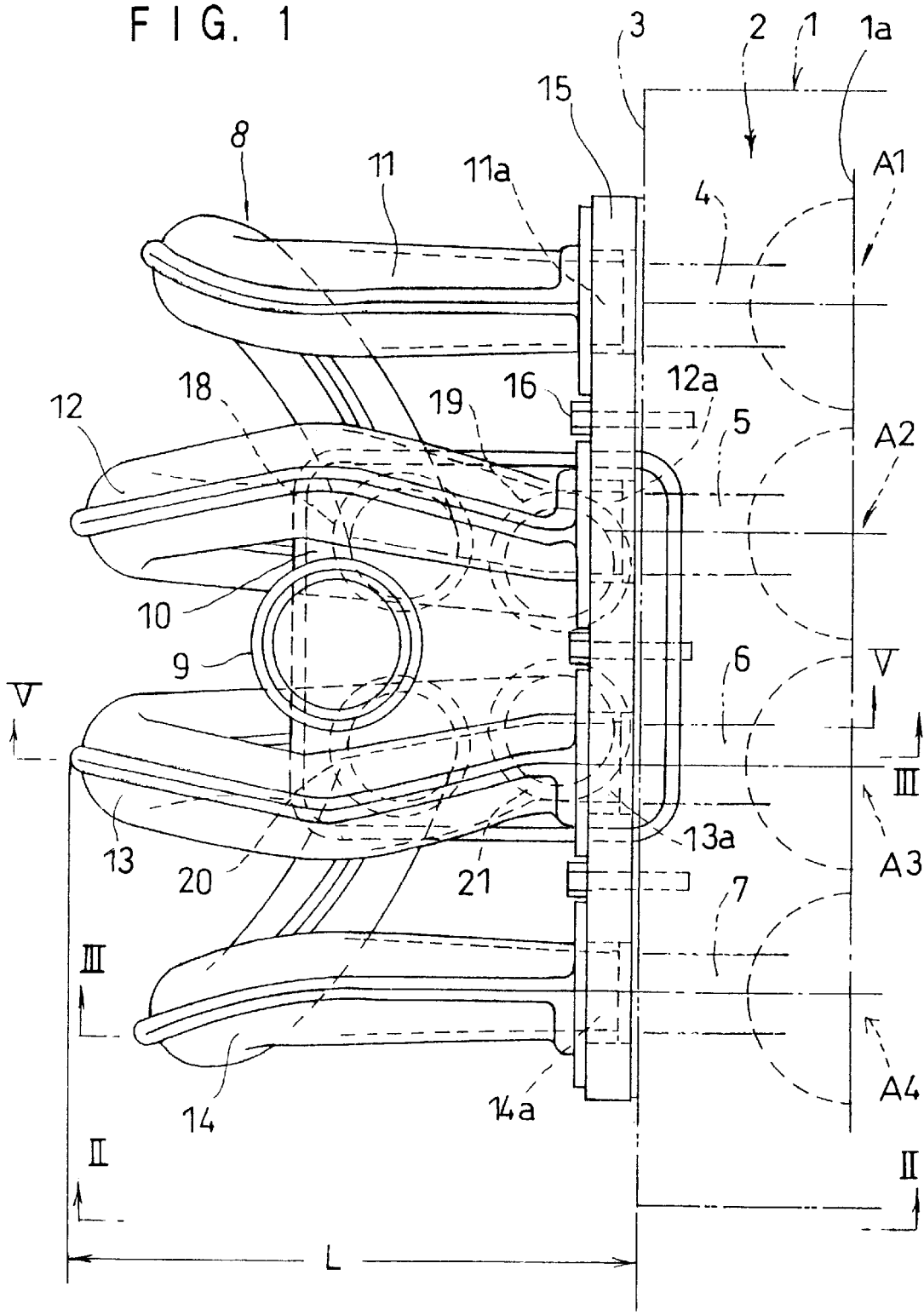
FIG. 1 is a plan view showing a multi-cylinder internal combustion engine provided with an inertia charge intake manifold embodying the present invention.

Reference is first made to FIG. 1 illustrating a multi-cylinder internal combustion engine which incorporates an inertia charge intake manifold in accordance with an embodiment of the present invention. In the illustrated embodiment, the engine generally represented by reference numeral 1 includes four cylinders A1, A2, A3, A4 arranged in series along a crank shaft axis 1a. The bore axis of each cylinder may extend generally vertically, i.e., perpendicularly to the horizontal plane containing the crank shaft axis 1a. The engine 1 further includes a cylinder head 2 having a corresponding number of intake ports 4, 5, 6, 7 each communicating with a respective one of the cylinders A1–A4. Each of the intake ports 4–7 is outwardly open at one longitudinal side surface 3 of the cylinder head 2.

Figure 2:
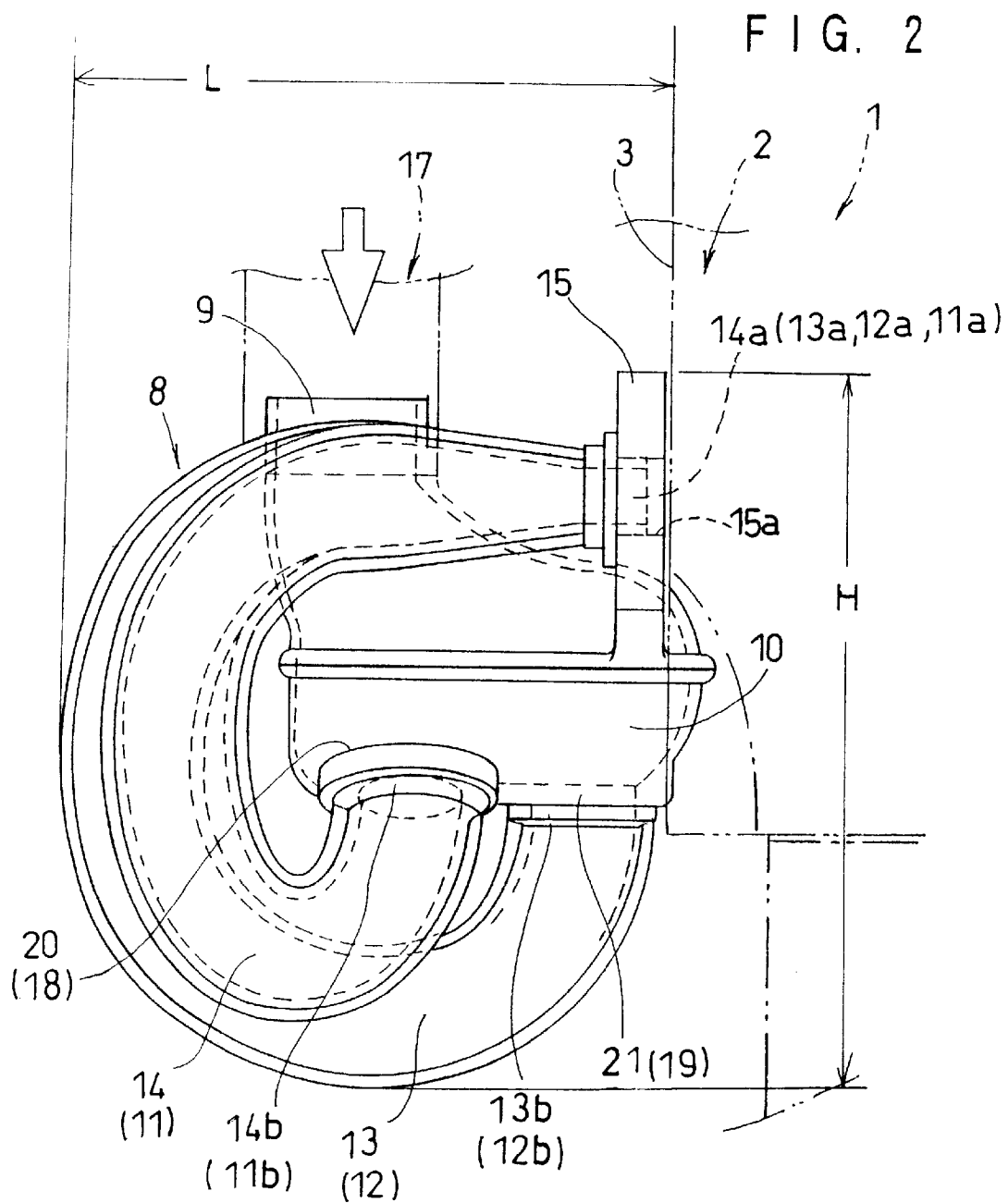
FIG. 2 is a side view showing the same intake manifold as seen in the direction of arrows II—II in FIG. 1.

The cylinder head 2 or the engine 1 as a whole is associated with an intake manifold 8 which mainly includes a surge tank 10 and four relatively long branch pipes 11, 12, 13, 14. In the illustrated embodiment, these four branch pipes are separately formed. Each of the branch pipes 11–14 is attached at one end (which may be called "upper end" below) to a common flange 15 which, in turn, is fixed to the longitudinal side surface 3 of the cylinder head 2 by bolts 16. In this way, the branch pipes 11–14 are held in communication with the respective intake ports 4–7. As shown in FIG. 2, the upper ends of the respective branch pipes 11–14 are arranged to extend horizontally.

The surge tank 10, the branch pipes 11–14 and the common flange 15 may all be made of a hard thermoplastic synthetic resin material such as polyamide resin (e.g. nylon). With the use of such a resin material, the overall weight of the intake manifold is made smaller than when a metal material is used.

As shown in FIGS. 1 and 2, the surge tank 10 of the intake manifold 8 enters partially under the cylinder head 2 at a portion between the two centrally located cylinders A2, A3 (the second and third cylinders). In other words, the cylinder head 2 partially overlaps the surge tank 10 horizontally. As a result, the surge tank 10 is arranged adjacent to the common flange 15, so that they are integrally connected. The surge tank 10 is provided with an outer side surface extending in parallel to the common flange 15.

The surge tank 10 is integrally formed with an intake pipe 9 which projects upwardly from the upper surface of the surge tank 10 at a position offset laterally outward from the center thereof. The upper end of the intake pipe 9 is removably connected to a throttle body 17 (FIG. 2) which is internally provided with a throttle valve (not shown).

On the other hand, the underside of the surge tank 10 is formed with four connecting portions 18, 19, 20, 21 for connection to the respective branch pipes 11–14 which are generally equal in length. As best shown in FIG. 2, each of the branch pipes 11–14 extends laterally from the longitudinal side surface 3 of the cylinder head 2 over the surge tank 10, then is bent downward to extend at a side of the surge tank 10, then is bent inward to extend under the surge tank 10, and is finally bent upward to be connected at the other end (which may be called "lower end" below) to a respective one of the connecting portions 18–21 of the surge tank 10.

As shown in the plan view of FIG. 1, the four connecting portions 18–21 at the underside of the surge tank 10 are located generally at the four corners of a square, rectangle or trapezoid, respectively. The two connecting portions 19, 21 disposed closer to the engine 1 are respectively connected to the two branch pipes 12, 13 extending respectively from the second and third cylinders A2, A3 located at the central portion of the cylinder series, whereas the other two connecting portions 18, 20 disposed farther from the engine 1 are respectively connected to the other two branch pipes 11, 14 extending respectively from the first and fourth cylinders A1, A4 located at both ends of the cylinder series.

In this way, each of the relatively long branch pipes 11–14 for connecting a respective one of the intake ports 4–7 (or the cylinders A1–A4) to a respective one of the connecting portions 18–21 of the surge tank 10 is bent to substantially surround the surge tank 10 which is disposed close to the longitudinal side surface 3 of the cylinder head 2. Thus, compared with the previously described prior art, the manifold 8 can be made much more compact. Specifically, the horizontal dimension L and the vertical dimension H shown in FIG. 2 can be made smaller.

In the illustrated embodiment, the surge tank 10 is arranged close to the engine 1 beyond the longitudinal side surface 3 of the cylinder head 2 in such a manner as to partially enter under the cylinder head 2 by a predetermined amount. This structure additionally contributes to a size reduction of the manifold 8 combined with the engine 1.

Further, the four connecting portions 18–21 on the underside of the surge tank 10 are arranged respectively at the four corners of a square, rectangle or trapezoid while the surge tank 10 itself is disposed at a central portion of the engine 1 along the longitudinal axis 1a of the crank shaft. As a result, the length of the surge tank 10 along the longitudinal axis 1a of the crank shaft can be reduced.

According to the illustrated embodiment, the two connecting portions 19, 21 disposed closer to the engine 1 are respectively connected to the two branch pipes 12, 13 extending respectively from the second and third cylinders A2, A3 located at the central portion of the cylinder series. More specifically, referring to FIGS. 5 and 6, the two branch pipes 12 and 13 are integrally formed at their upper ends with cylindrical engaging protrusions 12a and 13a, respectively. These protrusions 12a, 13a are to be fitted into connecting bores 15a formed in the common flange 15.

Figure 5:
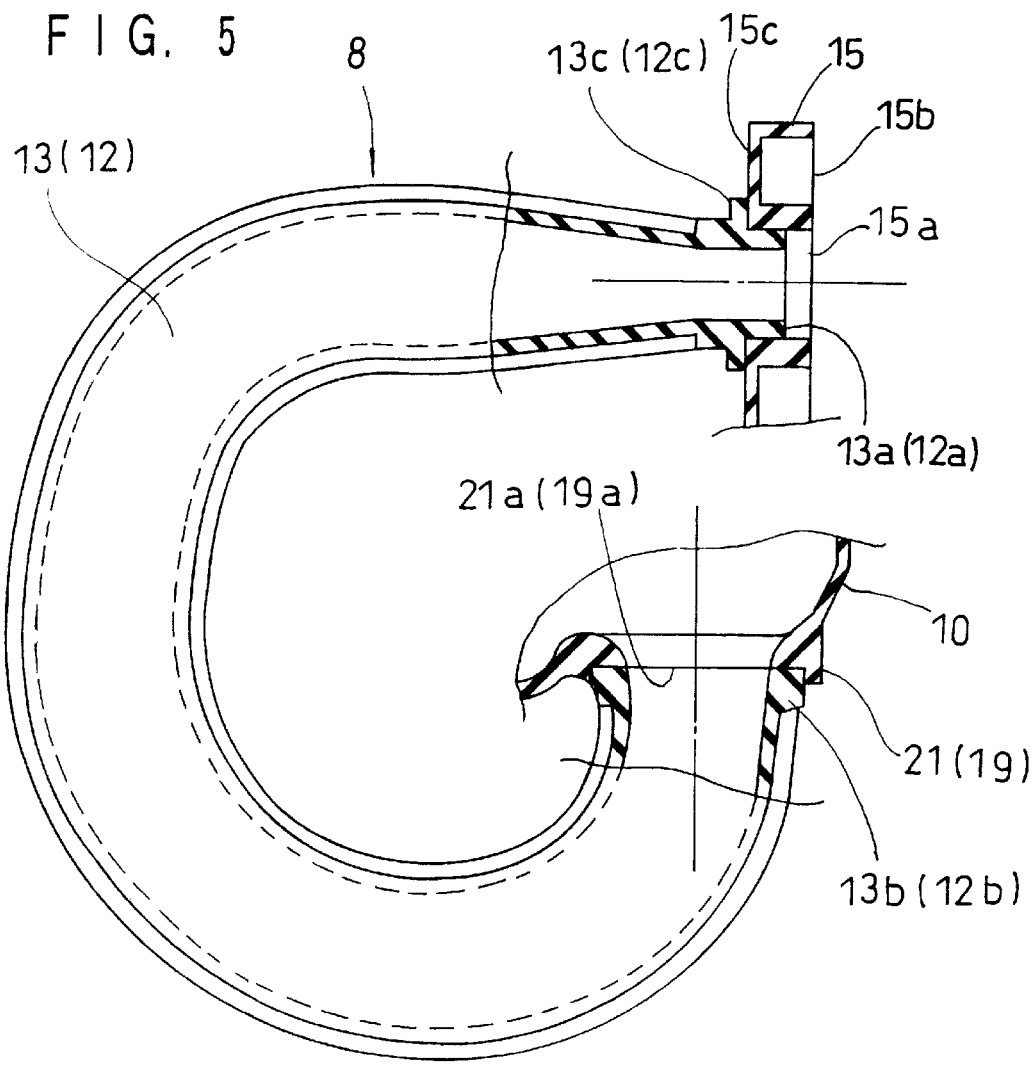
FIG. 5 is a fragmentary side view showing principal portions of the same intake manifold as seen in the direction of arrows V—V in FIG. 1.
Figure 6:
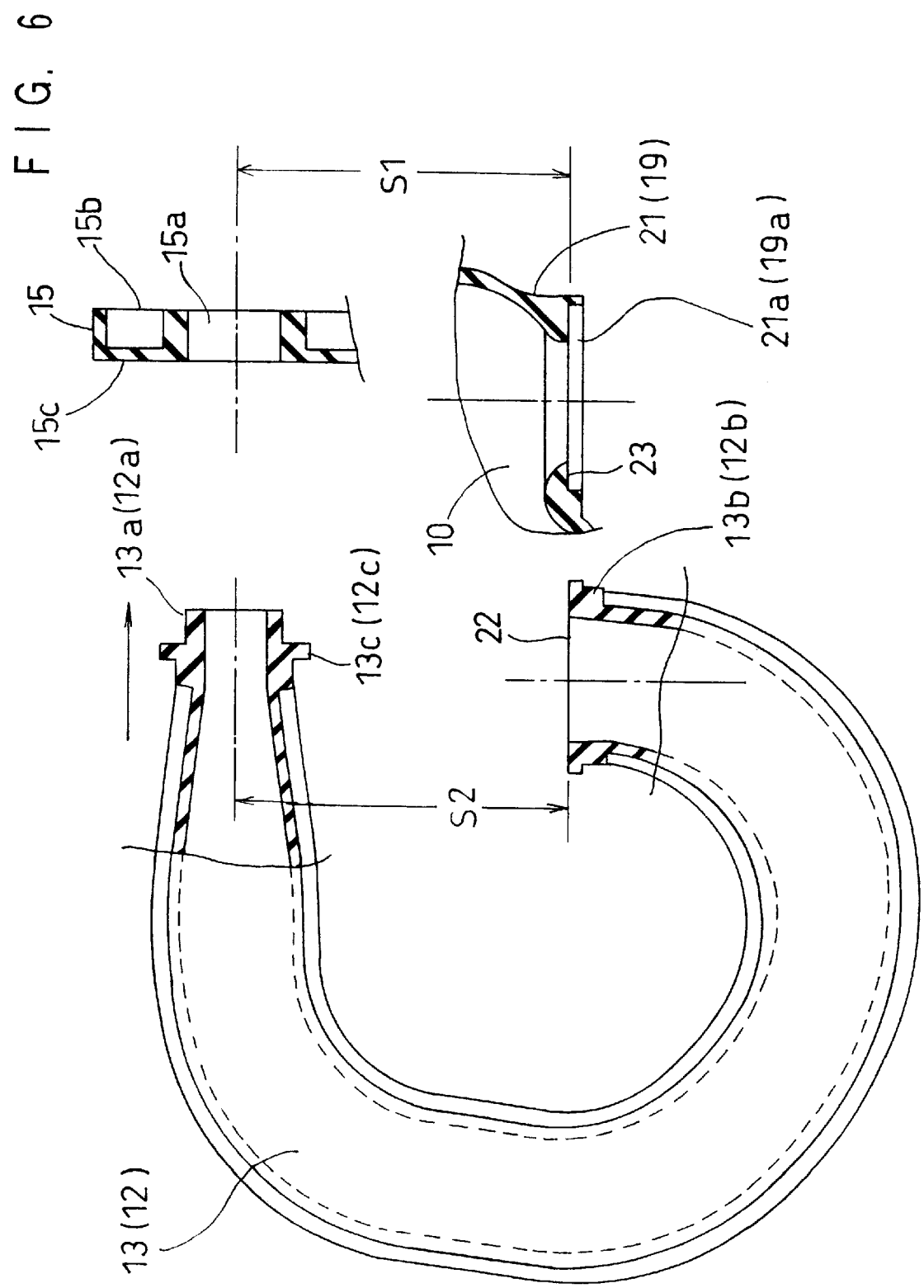
FIG. 6 is an exploded view showing the principal portions of FIG. 5.

At their lower ends, on the other hand, the branch pipes 12 and 13 are integrally formed with flanged portions 12b and 13b, respectively. These flanged portions 12b, 13b are to be fitted into receiving bores 19a and 21b of the respective connecting portions 19 and 21 of the surge tank 10. As seen in FIGS. 5 and 6, the central axes of the engaging protrusion 12a (or 13a) and the flanged portion 12b (or 13b) extend perpendicularly to each other.

As shown in FIG. 6, the distance S1 between the center of the connecting bore 15a of the common flange 15 and the upper surface 23 of the receiving bore 19a (21a) of the surge tank 10 is made slightly larger than the distance S2 between the center of the engaging protrusion 12a (13a) and the upper surface 22 of the flanged portion 12b (13b). Thus, in the state where the branch pipe 12 (13) is attached to the common flange 15 and the surge tank 10, the latter two components 15 and 10 can be held together without using an adhesive or any other fixing means.

Similarly, the other two connecting portions 18, 20 disposed farther from the engine 1 are respectively connected to the other two branch pipes 11, 14 extending respectively from the first and fourth cylinders A1, A4 located at both ends of the cylinder series. More specifically, referring to FIGS. 3 and 4, the two branch pipes 11 and 14 are integrally formed at their upper ends with cylindrical engaging protrusions 11a and 14a, respectively. These protrusions 11a, 14a are to be fitted into connecting bores 15a formed in the common flange 15.

Figure 3:
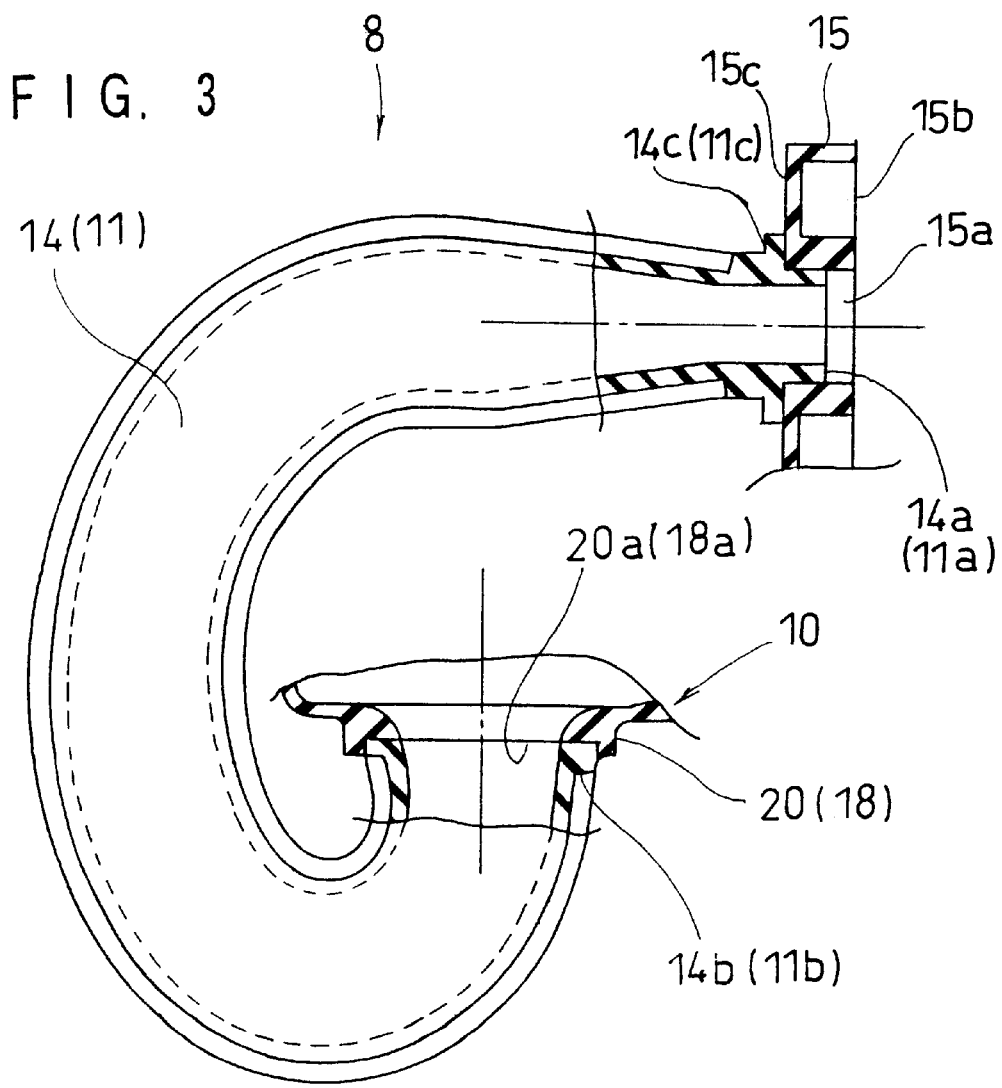
FIG. 3 is a fragmentary side view showing principal portions of the same intake manifold as seen in the direction of arrows III—III in FIG. 1.
Figure 4:
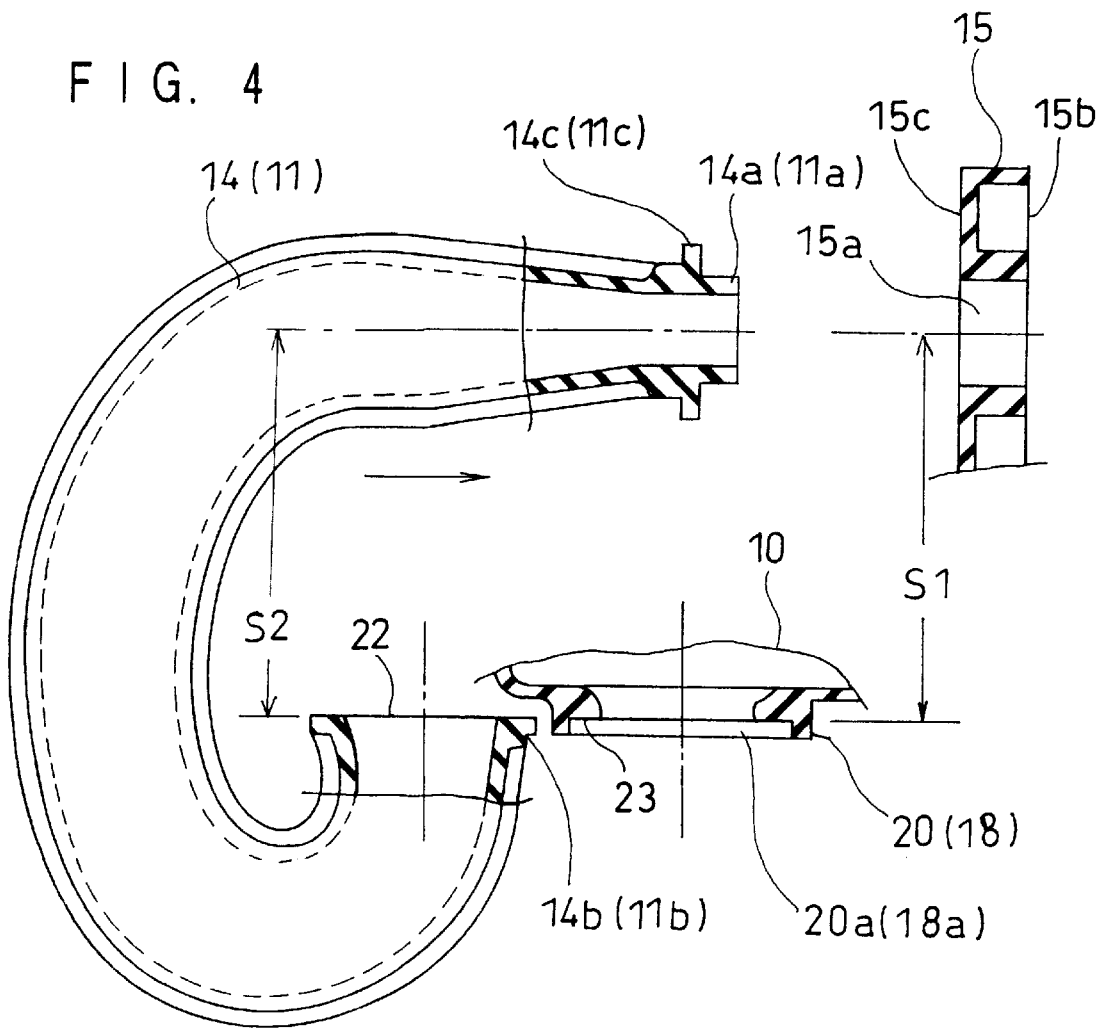
FIG. 4 is an exploded view showing the principal portions of FIG. 3.

At their lower ends, on the other hand, the branch pipes 11 and 14 are integrally formed with flanged portions 11b and 14b, respectively. These flanged portions 11b, 14b are to be fitted into receiving bores 18a and 20b of the respective connecting portions 18 and 20 of the surge tank 10. As seen in FIGS. 3 and 4, the central axes of the engaging protrusion 11a (or 14a) and the flanged portion 11b (or 14b) extend perpendicularly to each other.

As shown in FIG. 4, the distance S1 between the center of the connecting bore 15a of the common flange 15 and the upper surface 23 of the receiving bore 18a (20a) of the surge tank 10 is made slightly larger than the distance S2 between the center of the engaging protrusion 11a (14a) and the upper surface 22 of the flanged portion 11b (14b). Thus, in the state where the branch pipe 11 (14) is attached to the common flange 15 and the surge tank 10, the latter two components 15 and 10 can be held together without using an adhesive or any other fixing means.

The connecting arrangement of the above embodiment is advantageous for the following reasons.

For enabling inertia charge of an air-fuel mixture, all of the four branch pipes 11–14 must be substantially equal in length. Therefore, each of the branch pipes 11–14 needs to extend along a respective bent path for meeting this requirement. Further, the two intake ports 5, 6 for the second and third cylinders A2, A3 are located closer to the surge tank 10 than the other two intake ports 4, 7 for the first and fourth cylinders A1, A4, whereas the two connecting portions 19, 21 of the surge tank 10 are located closer to the engine 1 than the other two connecting portions 18, 20.

On the above basis, it is hypothetically assumed that the two connecting portions 18, 20 disposed farther from the engine 1 are respectively connected to the two branch pipes 12, 13 extending respectively from the second and third cylinders A2, A3, whereas the other two connecting portions 19, 21 disposed closer to the engine 1 are respectively connected to the other two branch pipes 11, 14 extending respectively from the first and fourth cylinders A1, A4. In this case, the downwardly extending portions of the two branch pipes 12, 13 shift laterally outward by as much as the two connecting portions 18, 20 are located farther from the engine 1 than the other two connecting portions 19, 21. As a result, the laterally projecting length L (see FIG. 1) of the downwardly extending portions of the two branch pipes 12, 13 becomes relatively large, thereby making the intake manifold 8 bulky.

In reality, however, the two connecting portions 19, 21 disposed closer to the engine 1 are connected to the two branch pipes 12, 13 extending from the second and third cylinders A2, A3, whereas the other two connecting portions 18, 20 disposed farther from the engine 1 are connected to the other two branch pipes 11, 14 extending from the first and fourth cylinders A1, A4. Therefore, the downwardly extending portions of the two branch pipes 12, 13 shift laterally inward by as much as the two connecting portions 19, 21 are located closer to the engine 1 than the other two connecting portions 18, 20. As a result, the laterally projecting length L of the downwardly extending portions of the two branch pipes 12, 13 is relatively small, thereby realizing compactness of the intake manifold 8 as a whole.

On the other hand, due to the above-described connecting arrangement of the four branch pipes 11–14, each of the two branch pipes 11, 14 extending from the first and fourth cylinders A1, A4 must be bent to enter a limited space between the surge tank 10 and a respective one of the other two branch pipes 12, 13 under the surge tank 10.

Under this condition, the respective axes of the two connecting portions 19, 21 connected to the branch pipes 12, 13 are oriented vertically as shown in FIGS. 1 and 2, whereas the respective axes of the other two connecting portions 18, 20 connected to the branch pipes 11, 14 are oriented obliquely at a suitable angle. In other words, the two connecting portions 18, 20 connected to the branch pipes 11, 14 are inclined to be directed away from each other. Such inclined orientation of the connecting portions 18, 20 is desirable for the following reasons.

It is now assumed that the respective axes of the two connecting portions 18, 20 connected to the branch pipes 11, 14 are vertically oriented substantially in parallel to the respective axes of the two connecting portions 19, 21 connected to the branch pipes 12, 13. In this case, each of the two branch pipes 11, 14 needs to be bent sharply with a small curvature near the surge tank 10 for entering into the limited space between the surge tank 10 and a respective one of the other two branch pipes 12, 13. As a result, the flow resistance within the branch pipes 11, 14 inevitably increases, consequently providing a hindrance to gas feed. Further, a sharp bend of these branch pipes 11, 14 makes a manufacturing process difficult regardless of the fact that they are made of a resin.

In reality, however, the two connecting portions 18, 20 of the surge tank 10 are inclined at the predetermined angle to be directed away from each other for respective connection to the branch pipes 11, 14. Therefore, each of the two branch pipes 11, 14 does not need to be bent sharply for entering into the limited space between the surge tank 10 and a respective one of the other two branch pipes 12, 13. As a result, the flow resistance within the branch pipes 11, 14 may be kept relatively low. Further, these branch pipes 11, 14 may be manufactured relatively easily.

With respect to the flow resistance within the branch pipes 11–14, it should also be appreciated that these branch pipes are made of a hard resin. In this arrangement, the inner surface of each branch pipe is rendered smooth, whereby the flow resistance within the pipe is advantageously low.

As previously described, the intake pipe 9 of the surge tank 10 is provided at a position offset laterally outward from the center of the surge tank 10 (see FIGS. 1 and 3). This offset arrangement of the intake pipe 9 is preferable for removably mounting the throttle body 17 to the intake pipe 9 without interfering with the engine 1.

As can be seen from FIG. 2, the intake pipe 9 may be preferably inclined or curved in such a way that its axis is directed toward the general center of the square, rectangle or trapezoid defined by the four connecting portions 18–21 of the surge tank 10. Such an orientation of the intake pipe 9 is advantageous for evenly distributing the air-fuel mixture to the four branch pipes 11–14 while also reducing the flow resistance against the air-fuel mixture. If the intake pipe 9 is arranged offset laterally outward but is not inclined or curved in this way, the air-fuel mixture supplied through the intake pipe 9 is unevenly distributed with respect to the four branch pipes 11–14, and a smooth gas flow within the surge tank 10 is hindered to result in an increase of the flow resistance.

Further, as also shown in FIG. 2, the intake pipe 9 may be preferably flared toward the interior of the surge tank 10 to have a progressively increasing cross section. This flaring configuration of the intake pipe 9 combined with the above-described orientation thereof is additionally advantageous for even distribution of the air-fuel mixture with respect to the different branch pipes 11–14 and for a flow resistance reduction.

The throttle body 17 (FIG. 2) is further provided with a conduit (not shown) for introducing blow-by gas from the cylinder head 2 of the engine 1 or purging air from a canister (not shown) at a position downstream from the non-illustrated throttle valve.

Reference is now made to FIGS. 7–10 for illustrating a method for connecting the lower ends of the respective branch pipes 11–14 to the connecting portions 18–21 of the surge tank 10. For the connecting procedure, as will be described below, a heat-sealing method may conveniently be utilized.

Figure 7:
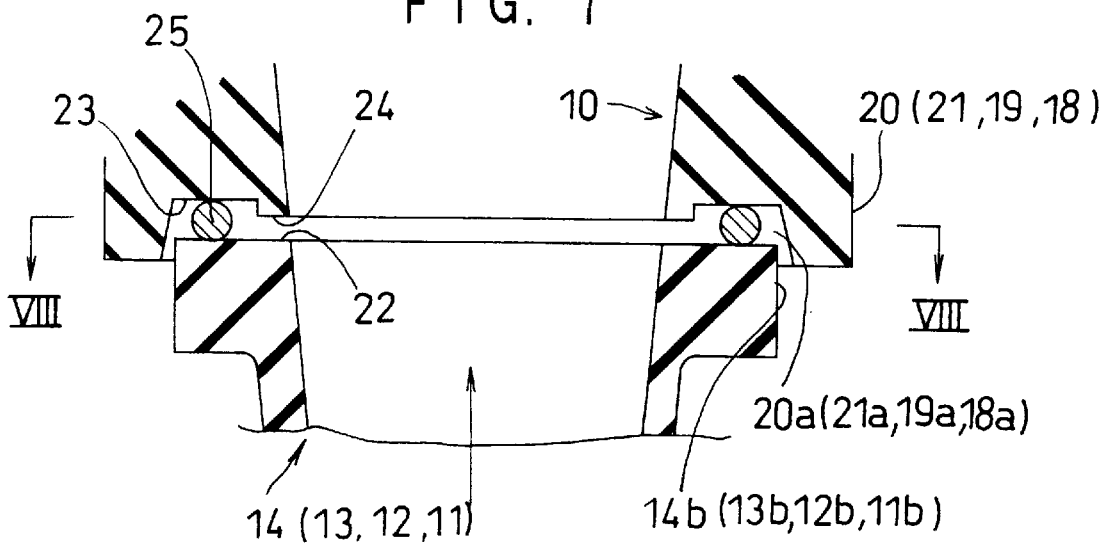
FIG. 7 is a sectional view illustrating a method for attaching a branch pipe to the surge tank.

First, as shown in FIG. 7, the lower ends 11b–14b of the branch pipes 11–14 are formed into flat end surfaces 22 so that these flat end surfaces are perpendicular to the axial lines of the lower ends 11b–14b. Correspondingly, receiving bores 18a–21a are formed at the connecting portions 18–21 of the surge tank 10. Each of the receiving bores 18a–21a is provided with a connecting surface 23 and with a circular protruding portion 24.

Figure 8:
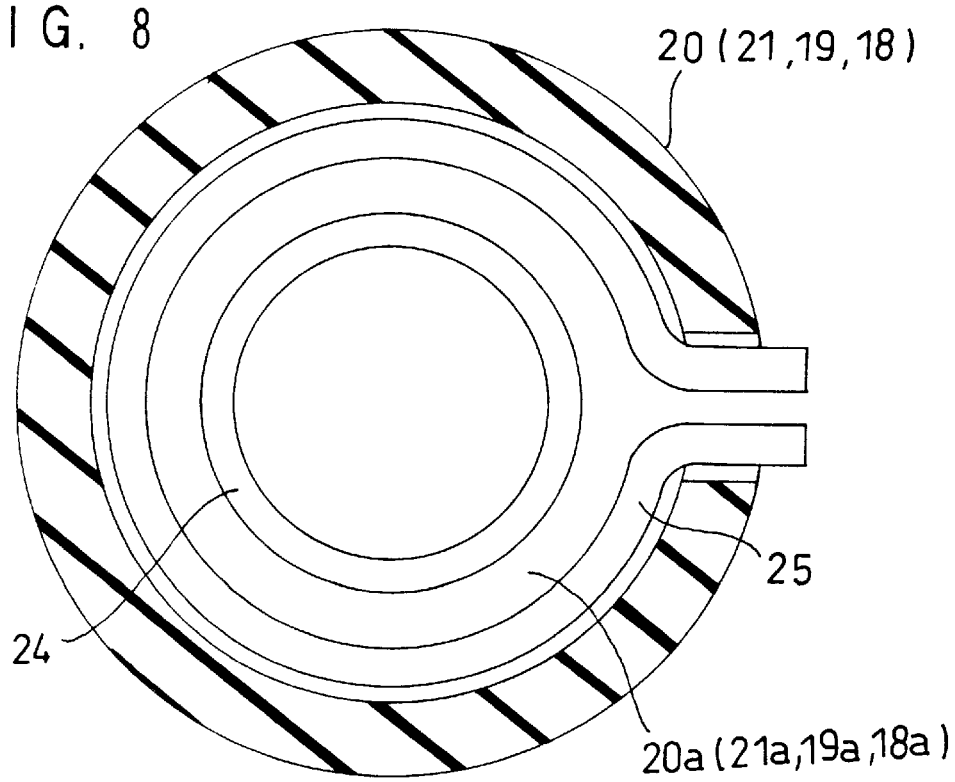
FIG. 8 is a sectional view taken along lines VIII—VIII in FIG. 7.

Then, a heating wire 25 is put in each of the receiving bores 18a–21a so that the wire passes around the protruding portion 24. Then, the heating wire 25 is held between the end surface 22 and the connecting surface 23, as shown in FIGS. 7 and 8. With the heating wire 25 thus provided, the branch pipes 11–14 are pressed against the surge tank 10. In this state, a suitable voltage is applied across the heating wire 25 for generating heat.

Figure 9:
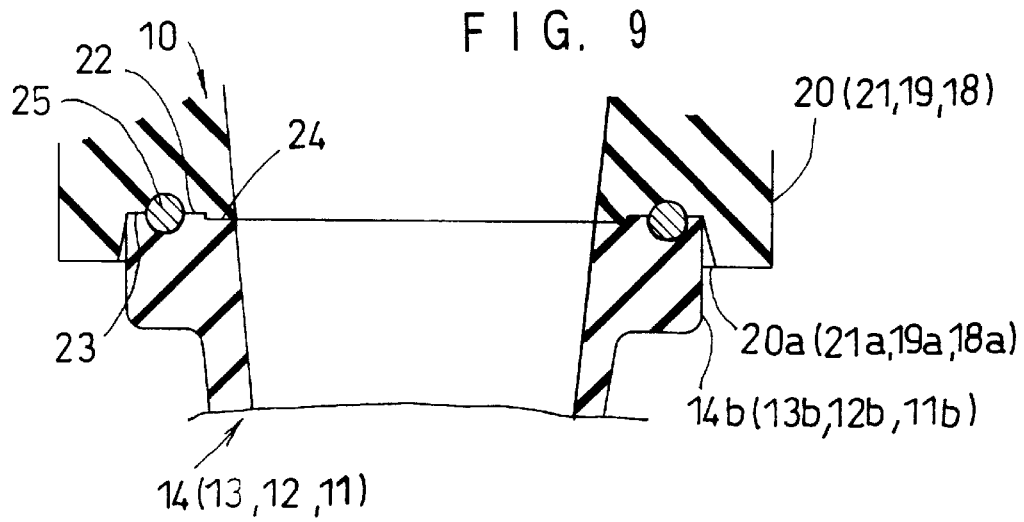
FIG. 9 is a sectional view showing the branch pipe connected to the surge tank.

The thus generated heat melts relevant parts of the end surface 22 and the connecting surface 23 which are pressed toward each other. As a result, the end surface 22 and the connecting surface 23 will be fused together, leaving the heating wire 25 embedded in the these two surfaces 22 and 23, as shown in FIG. 9.

In the above fusing process, melted resin is advantageously prevented from flowing inward of the branch pipes 11–14 due to the presence of the protruding portion 24. Thus, after the branch pipes 11–14 are fixed to the surge tank 10, there will be no remnants of solidified resin material on the inner surfaces of the branch pipes 11–14.

Differing from the above method, use may be made of an adhesive for nonremovably connecting the branch pipes 11–14 to the common flange 15.

In the illustrated embodiment, the protruding portions 24 are formed on the surge tank 10. Alternatively, those protrusions may be formed on the branch pipes 11–14, or on both the surge tank 10 and the branch pipes 11–14.

Figure 10:
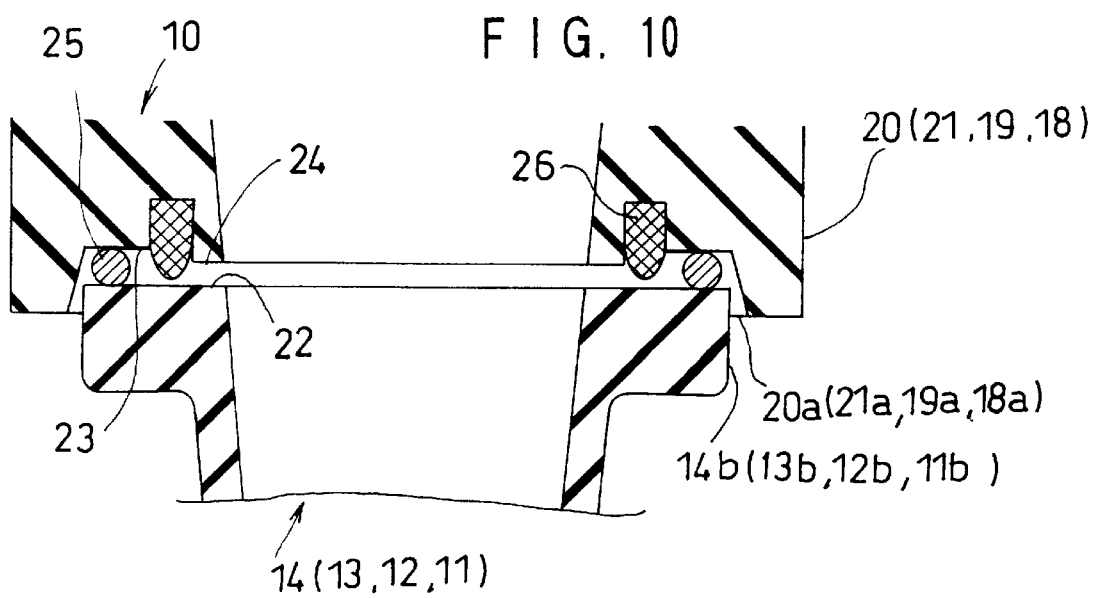
FIG. 10 illustrates another method for attaching the branch pipe to the surge tank.

As shown in FIG. 10, the surge tank 10 may additionally be provided with a sealing ring member 26 located between the heating wire 25 and the protruding portion 24. The ring member 26, which may be made of an elastic soft material, is partially embedded in the surge tank 10, as illustrated. For fixing the branch pipes 11–14 to the surge tank 10, the branch pipes 11–14 are pressed against the surge tank 10, while a predetermined voltage is being applied across the heating wire 25.

During the above procedure, the ring member 26 is squeezed between the branch pipe and the surge tank 10. In this manner, unfavorable resin flow into the branch pipes 11–14 is more reliably prevented.

The heat-sealing method described above is also applied for connecting the branch pipes 11–14 to the common flange 15. In this connection, reference is now made to FIGS. 11–16.

Figure 11:
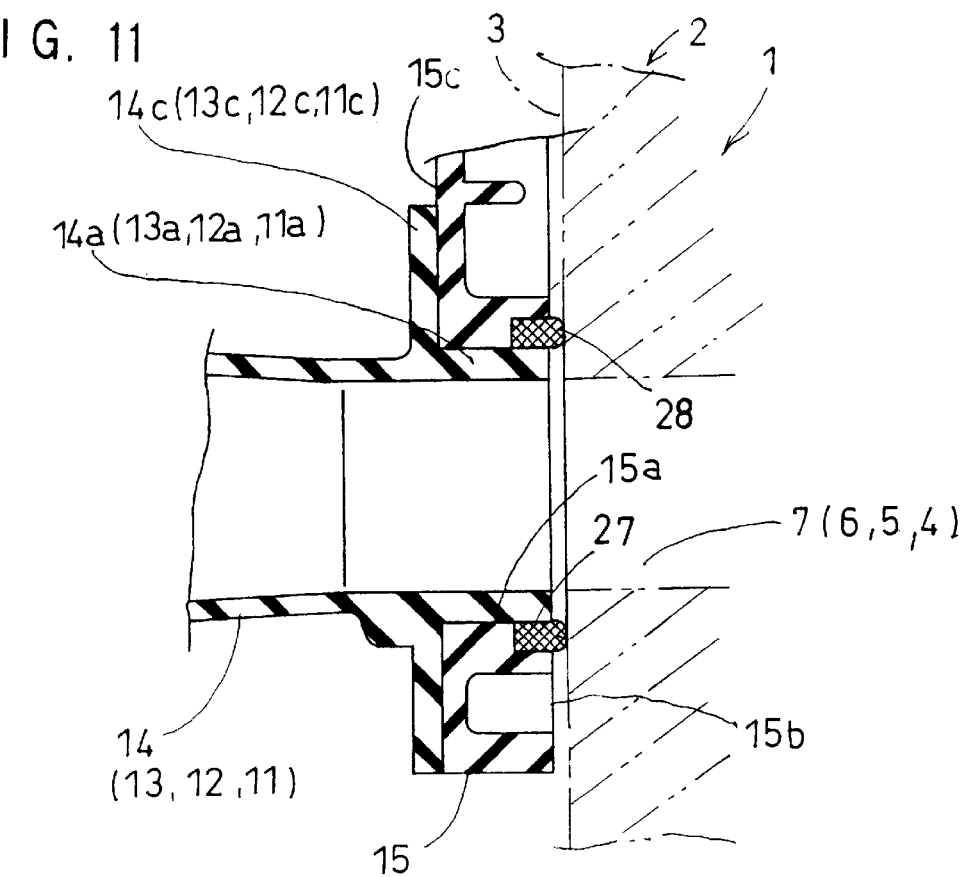
FIG. 11 is a sectional view showing a branch pipe attached to the common flange.
Figure 12:
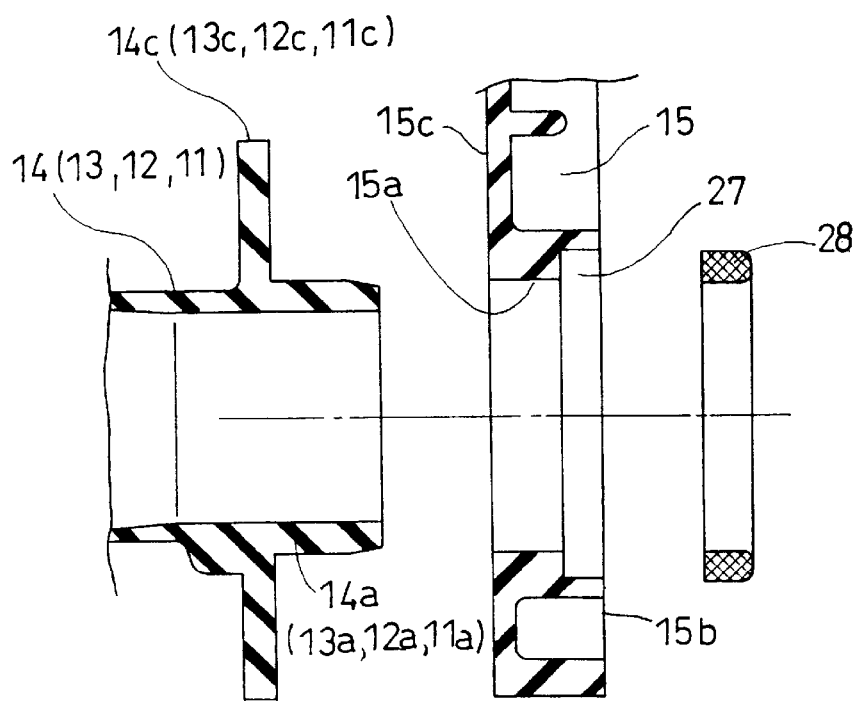
FIG. 12 is an exploded view showing the portions of FIG. 11.

As previously stated, the upper ends of the branch pipes 11–14 are formed with cylindrical engaging protrusions 11a–14a which are fitted into the connecting bores 15a of the common flange 15. As shown in FIGS. 11 and 12, the common flange 15 has a connecting surface 15b to be attached to the longitudinal side surface 3 of the cylinder head 2. On the opposite side of the connecting surface 15b, the common flange 15 has an obverse surface 15c.

As best shown in FIG. 12, in the connecting surface 15b, the common flange 15 is formed with circular hollow portions 27 each of which is coaxial with a respective one of the connecting bores 15a. As illustrated in FIGS. 11 and 12, a sealing member 28, which may be made of an elastic material such as rubber, is fitted into each hollow portion 27. The sealing member 28 has an axial dimension greater than that of the hollow portion 27. Thus, when fitted into the hollow portion 27, the tip of the sealing member 28 projects beyond the connecting surface 15b of the common flange 15 to a predetermined extent. With such an arrangement, when the common flange 15 is closely attached to the longitudinal side surface 3 of the cylinder head 2 with the bolts 16 (see FIG. 1), the intake ports 4–7 communicating with the branch pipes 11–14 are more reliably sealed.

Referring to FIGS. 13–16, the branch pipes 11–14 are fused to the common flange 15 in the following manner.

Figure 16:
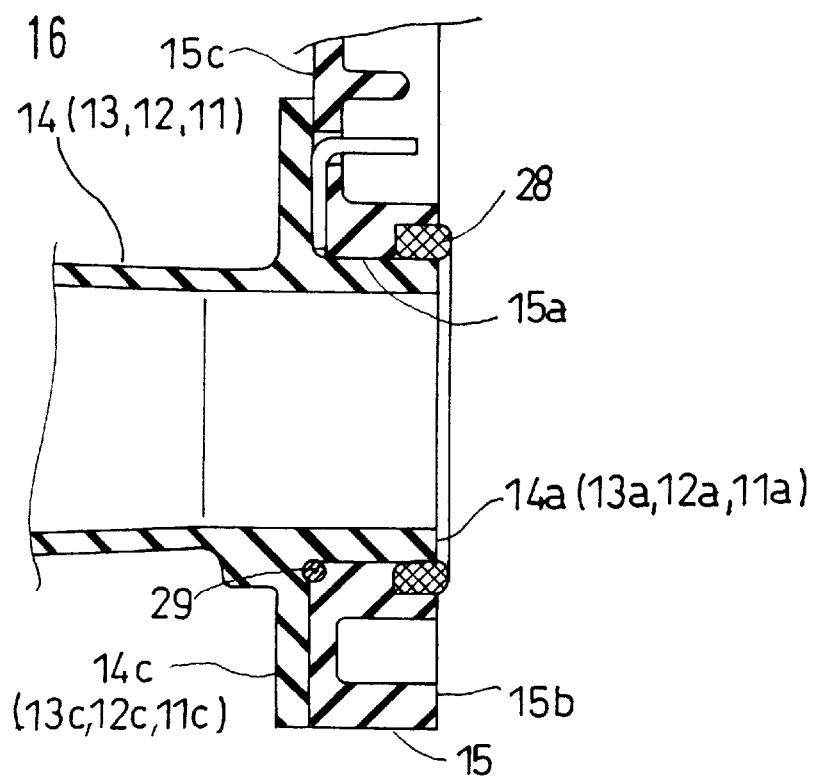
FIG. 16 is a sectional view showing the same branch pipe fixed to the common flange.

As stated above, the branch pipes 11–14 are previously formed with cylindrical engaging protrusions 11a–14a. Together with these protrusions 11a–14a, the respective branch pipes 11–14 are also formed with brims 11c–14c which are integrally connected to the protrusions 11a–14a, respectively. As shown in FIG. 16, when the branch pipes 11–14 are properly attached to the common flange 15, the brims 11c–14c come into close contact with the obverse surface 15c of the common flange 15. Such an arrangement is advantageous for enabling accurate positioning of the branch pipes 11–14 with respect to the common flange 15.

Figure 13:
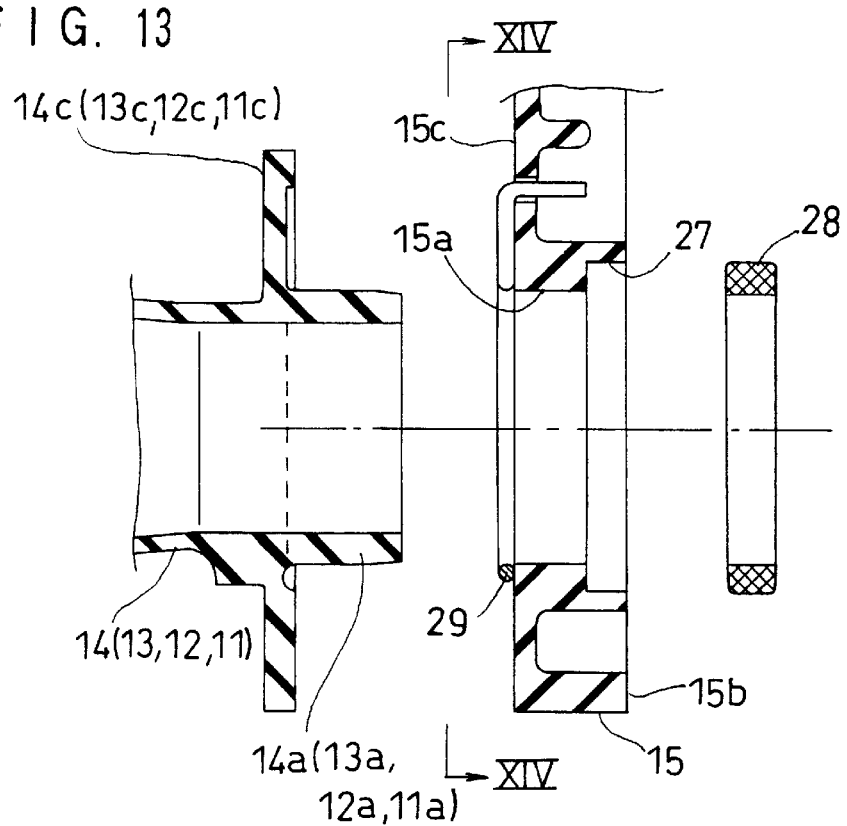
FIG. 13 is a sectional view illustrating a method for attaching a branch pipe to the common flange.
Figure 14:
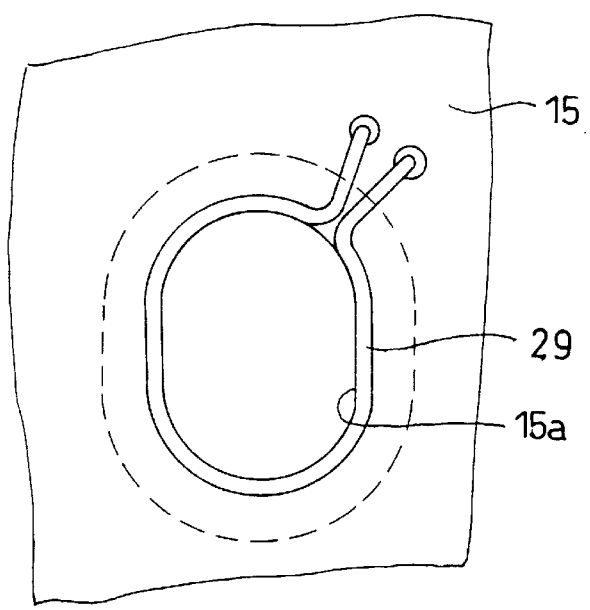
FIG. 14 is a view taken along lines XIV—XIV in FIG. 13.
Figure 15:
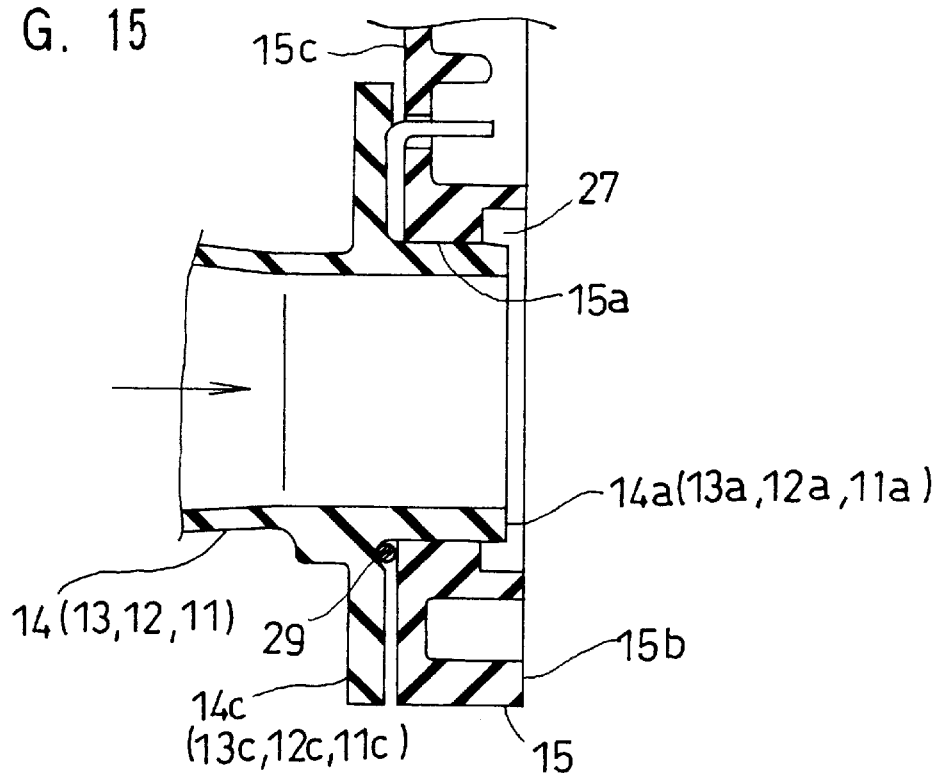
FIG. 15 is a sectional view showing a state in which the branch pipe of FIG. 13 is inserted into the common flange.

As shown in FIG. 13, before the branch pipes 11–14 are inserted into the connecting bores 15a of the common flange 15, heating wires 29 are arranged on the obverse surface 15c so that each heating wire 29 surrounds a corresponding one of the connecting bores 15a (see also FIG. 14). In other words, each heating wire 29 is arranged circumferentially of the corresponding one of the connecting bores 15a. With the heating wires 29 thus disposed, the engaging protrusions 11a–14a of the branch pipes 11–14 are fitted into the connecting bores 15a, so that the heating wire 29 is adjacent to the boundary between the engaging protrusions 11a–14a and the brims 11c–14c, as shown in FIG. 15.

Then, while the branch pipes 11–14 are being pressed against the common flange 15, a suitable voltage is applied across the respective heating wires 29 for generating heat. As a result, relevant parts of the branch pipes 11–14 and common flange 15 are melted and fused together, as shown in FIG. 16.

In the above embodiment, the engaging protrusions 11a–14a are inserted into the connecting bores 15a of the common flange 15. Thus, the branch pipes 11–14 can be firmly connected to the common flange 15. Further, since the heat sealing by using the heating wires 29 is performed outside of the engaging protrusions 11a–14a, melted resin will not flow into the branch pipes 11–14.

As described above, the branch pipes 11–14 are advantageously attached to the common flange 15 by heat-sealing. Alternatively, it is also possible to use an adhesive for nonremovably connecting the branch pipes 11–14 to the common flange 15.

In the illustrated embodiment, the intake manifold 8 is connected to the cylinder head 2 of the four-cylinder internal combustion engine 1. However, the present invention is not limited to such an embodiment.

For instance, the present invention may be applied to a three-cylinder internal combustion engine in which case the underside of a surge tank has three connecting portions located at the respective corners of an equilateral triangle with one side extending in parallel to the longitudinal axis of the cylinder head, or to a six-cylinder internal combustion engine in which case the underside of a surge tank has six connecting portions located at the respective corners of an equilateral hexagon with one side extending in parallel to the longitudinal axis of the cylinder head.

The present invention being thus described, it is obvious that the same may be varied in many other ways. Such variations are not to be regarded as a departure from the spirit and scope of the present invention, and all such modifications as would be obvious to those skilled in the art are intended to be included within the scope of the following claims.

What is claimed is:

1. An inertia charge intake manifold in an internal combustion engine having a plurality of cylinders, the intake manifold comprising:

elongated separate branch pipes each corresponding to a respective one of the cylinders;

a common flange for connecting a first end of each branch pipe to the internal combustion engine; and a surge tank to which a second end of said each branch pipe is connected;

wherein the common flange, the surge tank and said each branch pipe are made of a hard thermoplastic synthetic resin, the common flange being connected to the surge tank via said each branch pipe;

wherein the surge tank includes a plurality of connecting portions each for connection to the second end of a respective one of the branch pipes at least one of the connecting portions being located laterally closer to the engine, at least another of the connecting portions being located laterally farther from the engine; and wherein all of the branch pipes are substantially equal in length.

2. The intake manifold according to claim 1, wherein the surge tank has an external side surface, the common flange being arranged to extend generally in parallel to the external side surface of the surge tank.

3. The intake manifold according to claim 1, wherein said each branch pipe is bent so that the first end is horizontally oriented and the second end is upwardly oriented, the horizontally-oriented first end being fitted into a connecting bore formed in the common flange, the upwardly oriented second end being fitted into a receiving bore formed in an underside surface of the surge tank.

4. The intake manifold according to claim 1, wherein the first end of said each branch pipe is integrally formed with a cylindrical protrusion which is nonremovably fitted into a connecting bore formed in the common flange, the common flange being provided with a connection surface attached to the internal combustion engine, the connection surface being provided with a circular hollow portion extending around the cylindrical protrusion of said each branch pipe, the circular hollow portion being arranged to accommodate a ring-shaped sealing member in a manner such that the sealing member partially projects beyond the connection surface of the common flange.

5. The intake manifold according to claim 1, wherein the first end of said each branch pipe is provided with a brim coming into contact with the common flange.

6. The intake manifold according to claim 1, wherein the surge tank is located centrally of the engine in a crank axis direction, the common flange having a plurality of connecting portions each for connection to a respective one of the branch pipes, at least one of the connecting portions of the common flange being located closer to a center of the surge tank in the crank axis direction, at least another of the connecting portions of the common flange being located farther from the center of the surge tank, said one connecting portion of the common flange being connected to said one connecting portion of the surge tank via a corresponding branch pipe, said another connecting portion of the common flange being connected to said another connecting portion of the surge tank via a corresponding branch pipe.

7. An inertia charge intake manifold in an internal combustion engine having a plurality of cylinders, the intake manifold comprising:

elongated separate branch pipes each corresponding to a respective one of the cylinders;

a common flange separate from the branch pipes for connecting a first end of each branch pipe to the internal combustion engine; and a surge tank separate from the branch pipes for connection to a second end of said each branch pipe;

wherein the common flange, the surge tank and said each branch pipe are made of a hard thermoplastic synthetic resin, the common flange being connected to the surge tank via said each branch pipe; and wherein said each branch pipe is bent so that the first end is horizontally oriented and the second end is upwardly oriented, the horizontally oriented first end being fitted into a connecting bore formed in the common flange, the upwardly oriented second end being fitted into a receiving bore formed in an underside surface of the surge tank.

8. The intake manifold according to claim 7, wherein the second end of said each branch pipe has an end surface, the receiving bore of the surge tank having an upper surface for contact with the end face of the second end of said each branch pipe, a distance between a center axis of the connecting bore of the common flange and the upper surface of the receiving bore is larger than a distance between a center axis of the first end of said each branch pipe and the end surface of the second end of said each branch pipe when said each branch pipe is connected to the common flange and the surge tank.

9. An inertia charge intake manifold in an internal combustion engine having a plurality of cylinders, the intake manifold comprising:

elongated separate branch pipes each corresponding to a respective one of the cylinders;

a common flange for connecting a first end of each branch pipe to the internal combustion engine; and a surge tank to which a second end of said each branch pipe is connected;

wherein the common flange, the surge tank and said each branch pipe are made of a hard thermoplastic synthetic resin, the common flange being connected to the surge tank via said each branch pipe; and wherein the first end of said each branch pipe is integrally formed with a cylindrical protrusion which is fitted into a connecting bore formed in the common flange, the common flange being provided with a connection surface attached to the internal combustion engine, the connection surface being provided with a circular hollow portion extending around the cylindrical protrusion of said each branch pipe, the circular hollow portion and the cylindrical protrusion of said each branch pipe forming an annular recess for accommodating a ring-shaped sealing member in a manner such that the sealing member partially projects beyond the connection surface of the common flange.

10. The intake manifold according to claim 9, wherein the first end of said each branch pipe is provided with a brim coming into contact with the common flange.

11. The intake manifold according to claim 9, further comprising a wire interposed between the first end of said each branch pipe and the common flange.

* * * * *